United States Patent
Aström

(10) Patent No.: US 7,118,311 B2
(45) Date of Patent: Oct. 10, 2006

(54) SLOTTING CUTTER AND CUTTING INSERT THEREFOR

(75) Inventor: Willy Aström, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 488 days.

(21) Appl. No.: 10/181,894

(22) PCT Filed: Jan. 24, 2001

(86) PCT No.: PCT/SE01/00132

§ 371 (c)(1),
(2), (4) Date: Oct. 3, 2002

(87) PCT Pub. No.: WO01/54848

PCT Pub. Date: Aug. 2, 2001

(65) Prior Publication Data

US 2003/0103818 A1    Jun. 5, 2003

(30) Foreign Application Priority Data

Jan. 27, 2000    (SE) .................................. 0000244

(51) Int. Cl.
*B23D 13/00* (2006.01)
(52) U.S. Cl. .......................................... 407/46; 407/67
(58) Field of Classification Search ................ 407/46, 407/47, 49, 42, 48, 66, 67; 409/234
See application file for complete search history.

(56) References Cited

U.S. PATENT DOCUMENTS

| | | | |
|---|---|---|---|
| 4,315,706 A | 2/1982 | Erkfritz | |
| 5,163,788 A * | 11/1992 | Dahl et al. | 407/46 |
| 5,209,611 A * | 5/1993 | Drescher | 407/48 |
| 5,395,186 A * | 3/1995 | Qvart | 407/46 |
| 5,685,670 A * | 11/1997 | Satran | 407/42 |
| 5,800,079 A | 9/1998 | Qvarth | |
| 5,810,518 A | 9/1998 | Wiman et al. | |
| 5,924,826 A | 7/1999 | Byström et al. | |
| 6,004,080 A | 12/1999 | Qvarth et al. | |

FOREIGN PATENT DOCUMENTS

EP       0 873 808       10/1998

* cited by examiner

*Primary Examiner*—Willmon Fridie, Jr.
(74) *Attorney, Agent, or Firm*—Drinker Biddle & Reath LLP

(57) ABSTRACT

A slotting cutter includes a circular disc having an outer periphery along which a plurality of chip channels are formed which define respective seats for receiving respective index able cutting inserts. Each insert includes a planar bottom side. Either the seat or the bottom side has a male locator portion, and the other of the seat and the bottom side has a female locator portion which receives the male locator portion to define therewith and insert-locating structure. The male and female locator portions are offset laterally from a center plane of the insert oriented perpendicular to an axis of rotation of the disc. Alternating ones of the insert-locating structures are disposed on respective opposite sides of the center plane.

14 Claims, 3 Drawing Sheets

SLOTTING CUTTER AND CUTTING INSERT THEREFOR

TECHNICAL FIELD OF THE INVENTION

In a first aspect, this invention relates to a slotting cutter of the type that comprises a circular disc along the periphery of which a plurality of tangentially, spaced chip channels are formed, which house seats for indexable cutting inserts having a width which is larger than the thickness of the disc in order that the inserts can mill out a groove that is delimited by two parallel side surfaces and a bottom, during the milling of a workpiece, the cutting inserts having means for dividing the material which is separated from the bottom of the cutting groove into two or more partial chips.

Slitting cutters and slotting cutters should be considered as being the same.

PRIOR ART

Modern slotting cutters of the general type given above usually, make use of special cassettes for mounting the cutting inserts. Said cassettes are formed with a seat for the indexable cutting insert. as well as a serration for engagement with an analogous serration formed in the cutter disc in connection with the chip channel, the cassette being fixed in the desired position by means of a wedge. As for the cutting insert, it is fixed in the seat of the cassette by means of a screw, which is fastened in a threaded hole in the cassette via a central hole in the cutting insert. The individual cutting insert of the indexable type is in the shape of a flat body that has two opposite, inter-parallel major cutting edges adjacent to topside. By indexing the cutting insert, in the seat, first one of the major cutting edges and then the other can be used for the cutting work.

At least in larger production plants where slotting, cutters are used, the assembly of the cassettes on the cutter disc takes place in a central department equipped with sophisticated equipment and with the help of operators with specialist competence, while exchange of the cutting inserts is taken care of by many different, individual machine operators having varying levels of competence and without special equipment. This situation usually, means that the operational reliability of the slotting cutters is optimal when they are distributed to different machines from the central department, but when the milling cutters are put into work and exchanges of cutting inserts have become necessary, the reliability decreases. In particular, in previously known slotting cutters there is a risk for incorrect assembly of the cutting inserts, on one hand inasmuch as the positional accuracy may become mediocre, and on the other hand inasmuch as the cutting inserts may be indexed in a wrong way.

As initially mentioned, the cutting inserts for the modem slotting cutters are formed with particular means for dividing the material separated from the bottom of the cutting groove into two or more partial chips. The purpose of dividing the material into a plurality of partial chips instead of one single chip having the full groove width is to facilitate the release of the chip. The division of the material may take place in various ways. In SE 9701442-7 (publ. No. 511 567) corresponding to EP 0 873 808 an indexable cutting insert is described, one cutting edge of which is straight and extends along the entire width of the cutting insert. while an opposite second cutting edge is shorter and formed on a tapering portion of the end of the cutting insert, the shorter cutting edge in the mounted state being situated at a larger radial distance from the center of the cutting disc than the first, fully wide edge of an adjacent cutting insert. A slotting cutter equipped with such cutting inserts works in such a way that each short cutting edge removes a central chip having a limited width. After this, when the same material area is machined by a subsequent, full width cutting edge, the same will release two thin chips on either side of the central flute, which is left after removal of the first chip.

When a slotting cutter is equipped with cutting inserts having such means of dividing material, it is important that the cutting inserts are mounted in a correct way in the appurtenant seats, in connection with the frequently repeated insert changes. Namely, if two cutting inserts following each other along the periphery of the cutting disc would be mounted in an incorrect way, the cutting inserts will be loaded unevenly; something which may lead to inferior machining results and even breakdowns.

Aims and Features of the Invention

The invention aims at obviating the above-mentioned shortcomings of previously known slotting cutters and at providing an improved slotting cutter. Therefore, in a first aspect a primary aim of the invention is to provide slotting cutter where the cutting inserts may only be mounted in one single way, viz. in a correct position for each chip channel. An additional aim is to provide a slotting cutter which, during operation, gives plane and smooth bottom surfaces in the milled groove at the same time as the cutting forces are with certainty distributed evenly between the cutting inserts following each other, and the material cut loose should be divided into two or more partial chips to facilitate chip release.

According to the invention, at least the primary aim is attained by slotting cutter which comprises a circular disc having an outer periphery along which a plurality of tangentially spaced chip channels are formed. The channels house respective seats for index able cutting inserts. Each insert has a width which is larger than a thickness of the disc in order that the inserts can mill a groove delimited by two parallel side surfaces and a bottom during the milling of a workpiece. Each cutting insert has means for dividing material which is separated from the bottom of the cutting groove into two or more partial chips. Each cutting insert includes a generally plane bottom side. One of the seat and the bottom surface has a male locator portion, and the other of the seat and the bottom surface has a female locator portion receiving the male locator portion to define therewith an insert-locating structure. The male and female locator portions are offset laterally from a center plane of the insert oriented perpendicular to an axis of rotation of the disc. Alternating ones of the insert-locating structures are disposed on respective opposite sides of the center plane.

In a second aspect, the invention also relates to a cutting insert for the slotting cutter according to the invention. The features of this cutting insert include a body forming two opposing major cutting edges. Each cutting edge includes means for dividing a cut chip into a plurality of partial chips. Each recess includes a bottom side having a locator portion in the form of a male portion or a female portion which is laterally offset relative to a center plane of the body which bisects the cutting edges.

Additional Elucidation of Prior Art

In older types of slotting cutters having non-indexable cutting inserts which are connected by soldering, a countersink has been used in the only cutting edge of the cutting insert entailing that the cutting edge will release two partial chips spaced-apart by a bulge, which partial chips are separately of a limited width. However, in this case the cutting inserts are not dismountable and indexable, and therefore the risk for unintentional incorrect assembly cannot arise.

DETAILED DESCRIPTION OF PREFERRED EMBODIMENTS OF THE INVENTION

Figure 1:
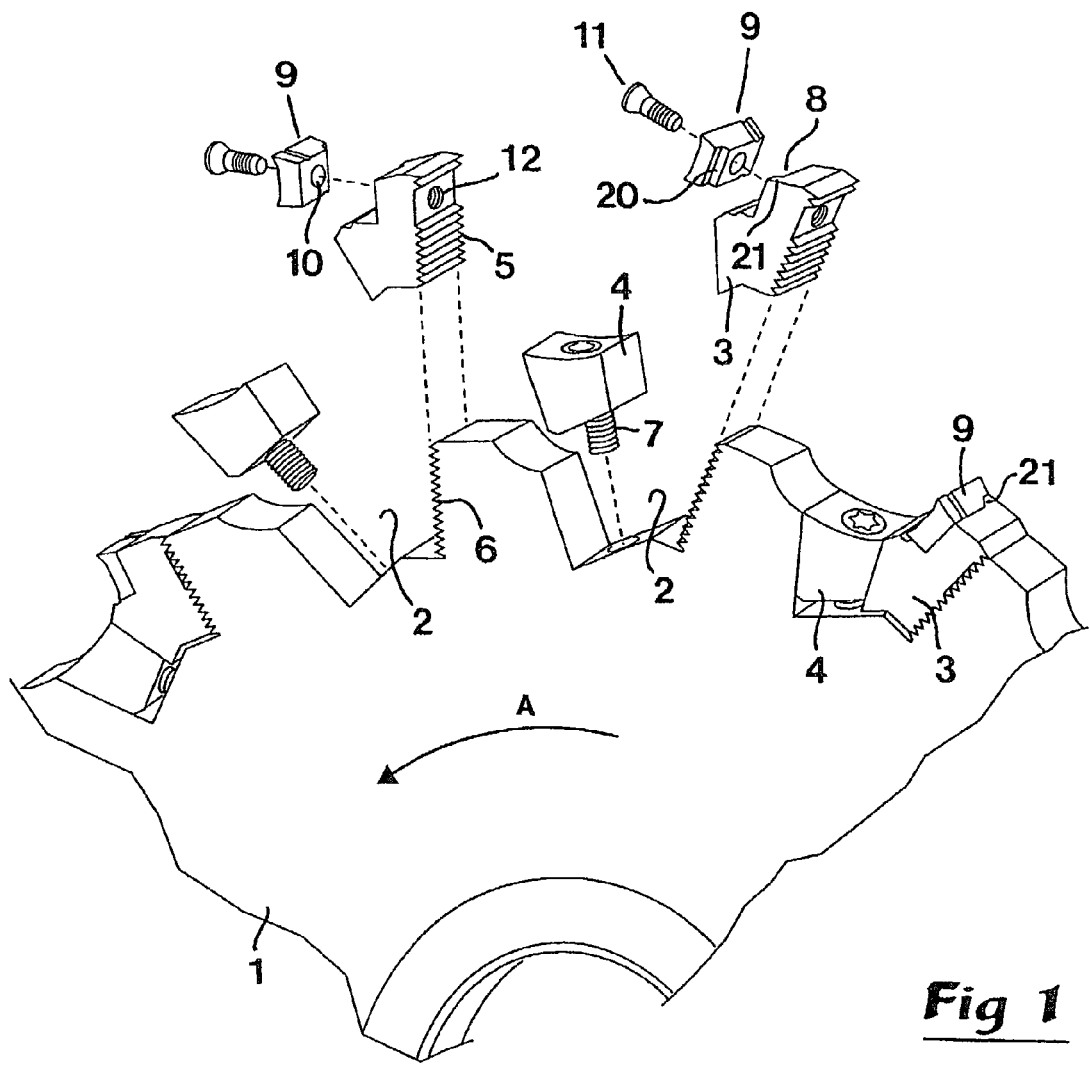
FIG. 1 is a partial, perspective, exploded view showing part of a cutter disc and a number of cutting inserts together with the appurtenant cassettes.

In FIG. 1, a slotting cutter is illustrated which includes a circular disc 1 being rotatable around a central axis of rotation (not shown), more precisely in the direction of the arrow A. Along the periphery of the disc, a plurality of tangentially spaced chip channels 2 are formed, each one of which houses a cassette 3, as well as a wedge 4 for fixing of the cassette. In order to secure the cassette 3 reliably, the same is formed with a serration 5 cooperating with a corresponding serration 6 in a rear wall of the chip channel. The wedge 4 is tightenable by means of a screw 7. In each cassette 3, a seat 8 is formed for the receipt of a cutting insert 9. In said cutting insert, there is a central hole 10 for a fixing screw 11, which is tightenable in a threaded hole 12 in the cassette.

Figure 3:
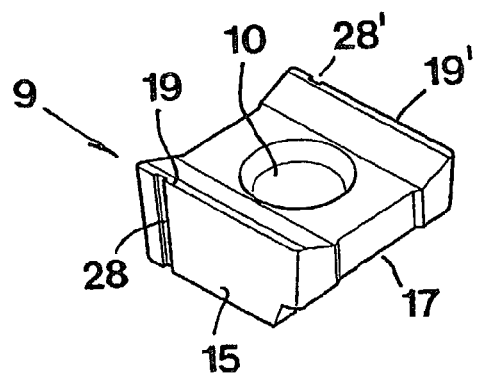
FIG. 3 is an enlarged perspective view showing an individual cutting insert according to the invention.
Figure 4:
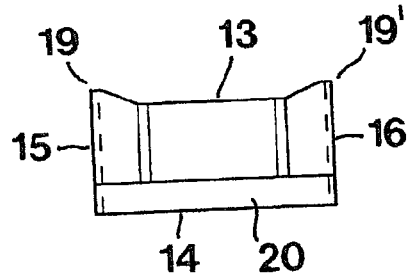
FIG. 4 is a side view of the cutting insert according to FIG. 3.
Figure 5:
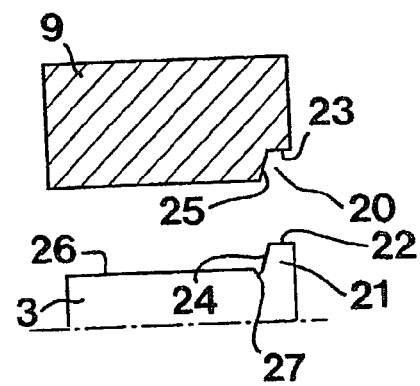
FIG. 5 is a cross-section through the same cutting insert shown in connection with an appurtenant cassette.

As is best seen in FIGS. 3–5, the cutting insert 9 consists of a flat body having a quadrangular basic shape which is delimited by a top side 13, a bottom side 14, first and second end surfaces 15, 16 in the form of flank surfaces, as well as two opposite, mutually parallel side surfaces 17, 18. In connection with the flank surfaces 15, 16, two opposite, mutually parallel major cutting edges 19, 19' are formed. The cutting insert is indexable. Thus, each one of the edges 19, 19' can be used actively; all depending on how the cutting insert is mounted in the seat 8.

Figure 2:
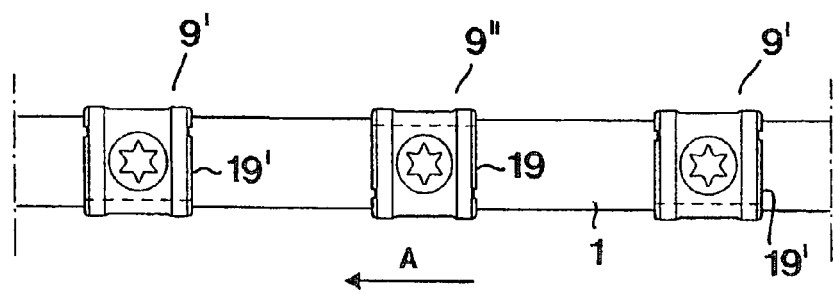
FIG. 2 is a schematic planar view showing three cutting inserts following each other in a hypothetically spread-out state.

In FIG. 2, three cutting inserts following each other on the cutter disc are shown in a hypothetical state, spread-out in the plane of the drawing, the cutting inserts being designated 9', 9'', 9''', etc. In an exaggerated way, it is shown how the cutting inserts are somewhat wider than the cutter disc. The drawing figure should be regarded so that the edges 19', 19 and 19', respectively, existing to the right in the drawing sheet are actively cutting, while the opposite edge on each cutting insert is inactive. In other words, the active cutting edge illustrated to the right on each cutting insert in FIG. 2, is situated radially farthest out in the mounted state illustrated in FIG. 1.

As far as the slotting cutter illustrated in the drawings has been described hitherto, the same is in all essentials previously known.

Characteristic of the invention, as this is represented by the embodiment in FIGS. 1–6, is that the cutting insert 9 on the bottom side thereof has a female locator portion in the form of a recess 20, which is arranged to cooperate with an analogous male locator portion in the form of a projection or male element 21 adjacent to the seat 8 of the cassette 3. In the illustrated, preferred embodiment, the recess 20 extends all the way along one side of the cutting insert, i.e., from one of the flank surfaces 15 to the opposite flank surface 16. At the same time, the male element 21 extends all the way along one side of the seat 8. More precisely, the male element is in the form of a material portion in the cassette 3 elevated in relation to the bottom 26 of the seat. The depth or height of the recess 20 is larger than the height of the male element 21, implying that a certain play arises between the ridge surface 22 of the male element and the bottom surface 23 of the recess when the cutting insert is mounted in the seat. The surface 24 of the male element 21 turned inwards is inclined at a certain, acute angle in relation to the plane of the cutting disc. Correspondingly, the surface 25 defining the recess 20 together with the bottom surface 23 is inclined, more precisely at the same angle as the surface 24. In practice, the angle of inclination may be within the range of 10–20°. In the transition between the side surface 24 of the male element and the plane bottom surface 26 of the seat, there is a throat 27, which guarantees that the corners of the cutting insert go free on assembly.

When the cutting insert 9 is fixed in the seat 8 of the cassette and is tightened by means of the screw 11, the inclined surfaces 24, 25 are pressed against each other, whereby the surfaces form support surfaces which determine the position of the cutting insert laterally in relation to the plane of the cutter disc.

Figure 6:
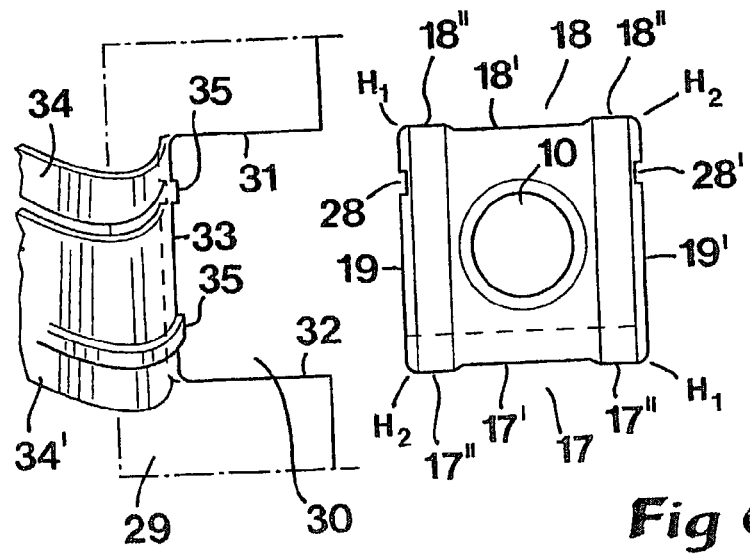
FIG. 6 is a planar view of the cutting insert shown in connection with a milled groove in a workpiece.

Countersinks 28, 28' are formed in the two flank surfaces 15, 16 of the cutting insert, which form interruptions in each one of the two cutting edges 19, 19'. In the example, said countersinks are in the shape of long narrow grooves. In FIG. 6, the cutting insert 9 is shown mounted with the cutting edge 19 in an active state turned towards a workpiece 29 so as to recess a groove 30, which is delimited by two side walls 31, 32 and a bottom 33. The ends of the cutting edge 19 or the corners in connection therewith are designated $H_1$ and $H_2$, respectively. The countersinks are spaced by equal distances from one side surface 18 of the insert. In doing so, the countersink 28 is situated at a relatively short distance from the corner $H_1$. When the groove 30 is milled, the cutting edge will separate two partial chips 34, 34', which are spaced apart by a bulge 35, which is left after the countersink 28. Due to the fact that the distance between the corner $H_1$ and the countersink 28 is short, the partial chip 34 will be comparatively narrow in relation to the chip 34'.

When the cutting insert 9 is indexed and mounted in another cassette, e.g., a preceding cassette, the opposite cutting edge 19' is directed towards the workpiece. Characteristic of the cutting insert is that the second countersink 28' is situated at another distance from the corner $H_1$ than the distance between the countersink 28 and the corner $H_1$ in connection with the cutting edge 19. This means that the bulge 35' that is left after the countersink 28' in the cutting insert in question will be laterally displaced in relation to the bulge 35. In this way, it is guaranteed that the individual bulge that has been left after a first cutting insert will be removed by the cutting edge of the subsequent cutting insert along the periphery of the cutting disc. Thus, when the milling cutter has completed the machining and left the cutting groove, a plane and smooth bottom is obtained in the groove.

Although the location of the two countersinks along the appurtenant cutting edges may vary, provided that the same at indexing of the cutting insert are not located in a line after each other along the bottom of the groove, it is preferred to form the countersinks as is shown in the drawings, more precisely on that side or half of the cutting insert which is opposite the recess 20.

According to a preferred embodiment of the invention, the cutting insert 9 is formed with a narrowed waist which is provided by two opposite, central surfaces 17', 18' being somewhat countersunk in relation to two spaced-apart partial surfaces 17" and 18", respectively, adjacent to the cutting edges. The surfaces 17" and 18" disposed adjacent the cutting edge are spaced apart by a longer distance than the surfaces 17', 18' that are disposed in a central region between the cutting edges. In the drawings, the surfaces 17', 18' are shown in an exaggerated countersunk state for the sake of clarity. Suppose that the cutting edge 19 is working actively, while the cutting edge 19' is inactive. In this case, the two partial surfaces 17", 18" adjacent to the inactive edge 19' will serve as support surfaces, which during milling abut against the side surfaces of the recessed cutting groove, more precisely at a certain distance from the bottom of the cutting groove. Due to the fact that the partial surfaces in this way support against the side surfaces of the cutting groove, the cutting insert is stabilized and guarantees a steady operation.

It should be pointed out that partial surfaces 17", 18" do not necessarily have to be in their entirety parallel to each other. Thus, in practice, at least parts of these surfaces may be slightly inclined in order to form flank surfaces behind the appurtenant cutting edge.

In FIG. 1 it can be seen how every second cassette 3 has the male element 21 thereof formed on a right side, and other cassettes have the male element thereof situated on a left side. Although the cassettes 3 are detachable per se, the same are mounted in accurately calibrated settings in which they are allowed to remain during longer periods of time. Only when problems arise, will disassembly of individual cassettes be brought to the fore. However, during the day-to-day work at individual machines, the cutting inserts 9 are exchanged on repeated occasions. This is taken care of by the individual machine operator without any other help than simple tools, frequently under considerable time pressure. In previously known slotting cutters (e.g. EP 0 873 808), the risk for incorrect assembly of the cutting inserts has always been present latently. Through between the male elements 21 on the cassettes, which are rigidly fixed in exact positions and the recesses 20 on the individual cutting inserts according to the invention, the risk of incorrect assembly is eliminated. Thus, the individual cutting insert can be assembled only in one single way in the seat of the cassette, viz. with the male element in engagement with the recess in the cutting insert. On assembly, the surfaces 24, 25 being pressed against each other form support surfaces, which define an exact position for the cutting insert in relation to the cassette.

The embodiment of the invention illustrated in FIG. 3 is suitable for large and medium-large cutting inserts, but less suited for small cutting inserts. Since the screw hole 10 has to have a reasonably large diameter, the material between the hole and each side surface 17, 18 gets a limited volume; something that means that the recess 20 can weaken the cutting insert.

Figure 7:
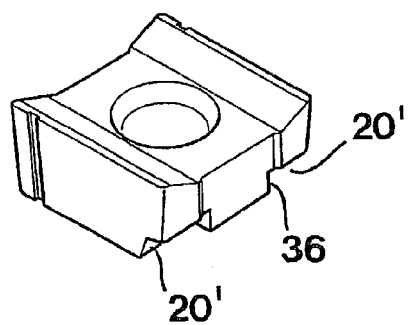
FIG. 7 is a perspective view corresponding to FIG. 3 showing an alternative cutting insert according to the invention.
Figure 8:
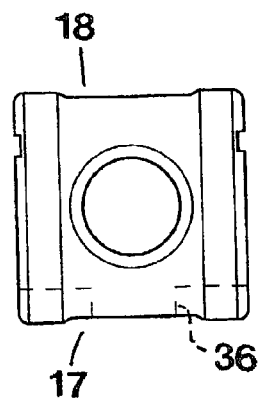
FIG. 8 is a planar view from above of the cutting insert according to FIG. 7.
Figure 9:
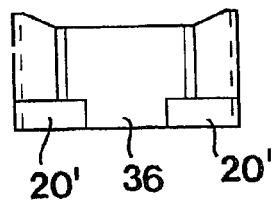
FIG. 9 is a side view of the cutting insert according to FIGS. 7 and 8.

In FIGS. 7–9, an embodiment is shown which is particularly suited for small cutting inserts. In this case, two minor recesses 20', 20' are formed along one side of the cutting insert, which recesses are spaced-apart by means of a strengthening material portion 36 which is placed opposite the screw hole 10. Of course, said two recesses 20' cooperate with two spaced-apart projections or male elements on each cassette.

Figure 10:
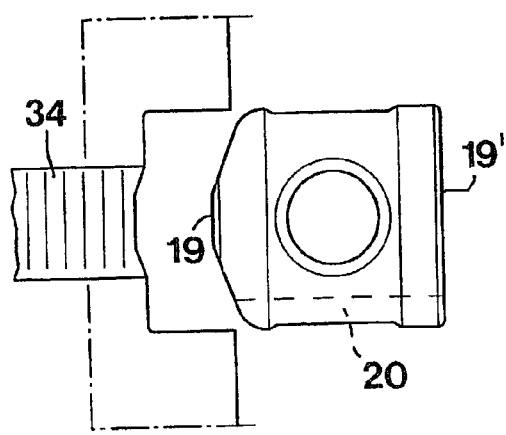
FIG. 10 is a planar view of an additional alternative cutting insert in a given operating state.
Figure 11:
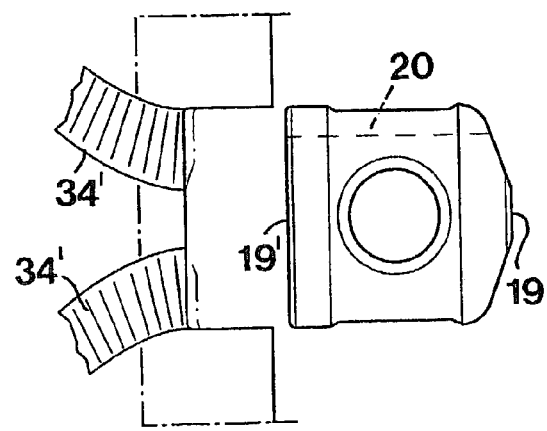
FIG. 11 is a planar view of another, indexed cutting insert of the same type.

In FIGS. 10 and 11, a cutting insert is shown formed according to the principle that is described in SE 9701442-7 corresponding to EP 0 873 808. Also in this case, the cutting insert has two opposite cutting edges 19, 19', one of which extends along the entire width of the cutting insert, while the other one is shorter and formed on a tapering portion of the opposite end of the cutting insert. As is seen in FIG. 10, the short edge 19 separates a central chip 34 having a limited width, material portions being left on both sides of a central flute in the bottom of the cutting groove. When a subsequent cutting insert having the long edge 19' thereof in an active position (see FIG. 11) in a subsequent operation machines the same material area, the material on both sides of the central flute will be separated while forming two spaced-apart chips 34', likewise having a limited width. In other words, the edges 19, 19' of cutting inserts following each other co-operate in such a way that three different, relatively thin part chips are separated while forming a plane bottom in the cutting groove.

According to the present invention, the cutting insert illustrated in FIGS. 10 and 11 is formed with a recess 20 arranged to cooperate with a male element on the cassette in the way described above.

Feasible Modifications of the Invention

The invention is not only limited to the embodiments described above and illustrated in the drawings. Thus, although the invention has been described in connection with a slotting cutter, the same can be applied also to metal slitting saws. Furthermore, the shape of the cooperating recesses and the male elements can be modified in a multiple ways within the scope of the subsequent claims. It should also be mentioned that the seats receiving the cutting inserts do not necessarily have to be formed in a detachable cassette. Thus, the seat can also be formed in the proper cutter disc or in a part permanently united therewith. Within the scope of the invention, it is also feasible to form the male element or the male elements in the cutting inserts, while the corresponding recess or recesses are formed in connection with the seat of the cutting insert.

The invention claimed is:

1. Slotting cutter, comprising a circular disc along an outer periphery of which a plurality of tangentially spaced chip channels are formed, which channels house respective seats for indexable cutting inserts; each insert having a width which is larger than a thickness of the disc in order that the inserts can mill a groove delimited by two parallel side surfaces and a bottom during the milling of a workpiece; each cutting insert having means for dividing material which is separated from the bottom of the cutting groove into two or more partial chips; each cutting insert having a generally plane bottom side; one of the seat and the bottom side having a male portion, and the other side of the seat and the bottom side having a female locator portion receiving the male locator portion to define therewith an insert-locating structure; the male and female locator portions being offset laterally from a center plane of the insert oriented perpendicular to an axis of rotation of the disc; alternating ones of the insert-locating structures being disposed on respective opposite sides of the center plane.

2. The slotting cutter according to claim 1 wherein the seats are removably mounted in the respective channels.

3. The slotting cutter according to claim 2 where in the seats comprise respective cassettes, alternating ones of the cassettes having their respective locator portions disposed to opposite respective sides of the center plane.

4. The slotting cutter according to claim 1 wherein each of the female locator portions constitutes a recess formed in the bottom surface of a respective insert, the recess extending completely along the bottom surface.

5. The slotting cutter according to claim 1 wherein each of the female locator portions constitutes two recesses formed in the bottom side, the two recesses spaced apart by a non-recessed portion of the bottom side situated along side a center through-hole of the insert.

6. The slotting cutter according to claim 1 wherein the depth of the female locator portion is greater than a height of the male locator portion projecting into the female locator portion.

7. The slotting cutter according to claim 6 wherein each male locator portion includes a first surface facing toward the center plane, and each female locator portion includes a second surface facing away from the center plane and abutting the first surface, each of the first and second surfaces being inclined obliquely relative to the center plane.

8. The slotting cutter according to claim 1 wherein the means for dividing the material comprises two countersinks formed in opposite cutting edges of the insert, the countersinks arranged such that the countersinks of successively positioned inserts are offset from one another relative to the center plane.

9. The slotting cutter according to claim 1 wherein each insert is a pair of cutting edges, and a pair of side surfaces interconnecting the cutting edges, each cutting edge having a countersink therein, the countersinks of each insert spaced equal distances from the same side surface.

10. The slotting cutter according to claim 1 wherein each insert includes a pair of cutting edges interconnected by a pair of side surfaces, the side surfaces being spaced apart by a first distance adjacent the cutting edges, and spaced apart by a second distance in a central region between the cutting edges, the second distance being shorter than the first distance.

11. A cutting insert for a slotting cutter comprising a body forming two opposing major cutting edges; each cutting edge including means for dividing a cut chip into a plurality of partial chips; said insert including a bottom side having a locator portion in the form of a male portion or a female portion which is laterally offset relative to a center plane of the body which bisects the cutting edges; wherein the means for dividing the chip comprises a countersink formed in each cutting edge.

12. The cutting insert according to claim 11 wherein the body includes two side surfaces interconnecting the cutting edges, the countersinks spaced by equal distances from a common one of the side surfaces.

13. The cutting insert according to claim 12 wherein the locator portion is disposed adjacent the other of the side surfaces.

14. A cutting insert for a slotting cutter comprising a body forming two opposing major cutting edges; each cutting edge including means for dividing a cut chip into a plurality of partial chips; said insert inlcuding a bottom side having a locator portion in the form of a male portion or a female portion which is laterally offset relative to a center plane of the body which bisects the cutting edges; wherein the body includes a pair of side surfaces interconnecting the cutting edges, the side surfaces being spaced apart by a first distance adjacent the cutting edges and spaced part by a second distance in a central region between the cutting edges, the second distance being shorter than the first distance.

* * * * *